United States Patent [19]
Arrington

[11] 3,972,071
[45] July 27, 1976

[54] PORTABLE RECORDER CONTROL APPARATUS

[75] Inventor: William Marshall Arrington, Austin, Tex.

[73] Assignee: International Business Machines Corporation, Armonk, N.Y.

[22] Filed: June 27, 1975

[21] Appl. No.: 590,763

[52] U.S. Cl. .................. 360/86; 179/100.1 DR; 360/61; 360/62; 360/74
[51] Int. Cl.² ................. G11B 15/10; G11B 15/24; G11B 19/02; G11B 19/18
[58] Field of Search ............. 360/86, 71, 74, 97, 360/61–62; 200/157, 6 A, 50, 51.03, 51.05; 74/483 R; 179/100.1 DR, 100.1 PS

[56] References Cited
UNITED STATES PATENTS

| | | |
|---|---|---|
| 3,425,701 | 2/1969 | Robinson et al. ................. 274/39 A |
| 3,454,731 | 7/1969 | Hori et al. ............................. 360/61 |
| 3,729,201 | 4/1973 | Dollenmayer ......................... 360/86 |
| 3,822,372 | 7/1974 | Coenen et al. ...................... 200/157 |
| 3,921,214 | 11/1975 | Nyffenegger .............. 179/100.1 DR |

Primary Examiner—Alfred H. Eddleman
Attorney, Agent, or Firm—James H. Barksdale, Jr.

[57] ABSTRACT

A portable disc recorder control apparatus operable both upon insertion of a recording disc and manipulation of a single control button. After insertion and positioning of the disc, such functions and operations as special instruction recording, stopping, ejecting, playing, and reviewing are controlled by the apparatus. These functions and operations are initiated through the single control button.

10 Claims, 4 Drawing Figures

PORTABLE RECORDER CONTROL APPARATUS

BACKGROUND OF THE INVENTION

1. Field of the Invention

This invention relates generally to magnetic recording apparatus. More specifically, this invention relates to apparatus for preparing for, and controlling, dictation functions and record media handling operations in a portable disc recorder.

2. Description of the Prior Art

Disc recorders, per se, are old and well known in the prior art. These recorders vary from office types having a separate microphone and included control buttons to miniature portable types having included microphones and control buttons. When a multiple function, single button miniature pocket recorder is considered, size and reliability of control apparatus present serious problems. Representative of the closest known prior art are British patent 869,376 to Amies, and U.S. Pat. Nos. 3,425,701, 3,729,201 and 3,822,372. In the British patent, a record disc is inserted through a slot in the case. During insertion, the periphery of the record engages and moves a lever. The lever operates means for clamping the record between a pair of gripping members and starting a drive motor. Although insertion of a record causes various structural operations to be performed, the structure disclosed in this patent is dissimilar to that of the instant invention. Further, the function of the apparatus of this patent is limited to playback. The apparatus disclosed in U.S. Pat. No. 3,425,701 is also limited to playback capabilities. Again, the structure involved is different from that of the instant invention. U.S. Pat. No. 3,729,201 discloses a miniature dictation machine capable of recording, reverse, and playback. Although the functions of this apparatus are somewhat expanded over the previously mentioned references, they are still limited. In terms of both function and structure, the disclosure of U.S. Pat. No. 3,822,372 is considered to be the closest prior art. This reference is deficient in that it is only designed to output signals. These signals cause various operations to be performed in a dictation apparatus connected thereto via an electrical line cord. Control as contemplate herein is not conditioned or operable upon insertion of a disc in this patent.

SUMMARY OF THE INVENTION

The control apparatus of this invention will permit the construction of a compact and reliable portable dictation machine. This apparatus is primarily made up of 1) structure, operable by the single control button, for conditioning the recorder for performing dictation functions, 2) structure, operable by the control button, for ejecting a disc, and 3) structure, operable upon insertion of a disc, for loading the disc into the recorder. Ejecting a disc requires cooperation of a number of elements in sequence. This sequence is initiated through manipulation of the control button. Insertion of a new disc into the recorder necessitates that a portion of this sequence be performed in reverse. This is initiated with the disc itself upon insertion thereof.

The operations which take place during ejection of a disc are: 1) disengaging a pawl from a leadscrew; 2) restoring a soundhead to a home position; 3) retracting a spindle from the disc; 4) restoring the head to the home position, if it were in a phased position prior to starting the disc eject operation; 5) disengaging a drive roller from the disc; 6) ejecting the disc; and 7) latching an eject cam in an eject position.

The operations which take place when inserting a new disc are: 1) unlatching the eject cam; 2) engaging the spindle with the disc; 3) engaging the drive roller with the disc; and 4) retracting of an eject arm from the disc.

DESCRIPTION OF THE PREFERRED EMBODIMENT

Figure 1:
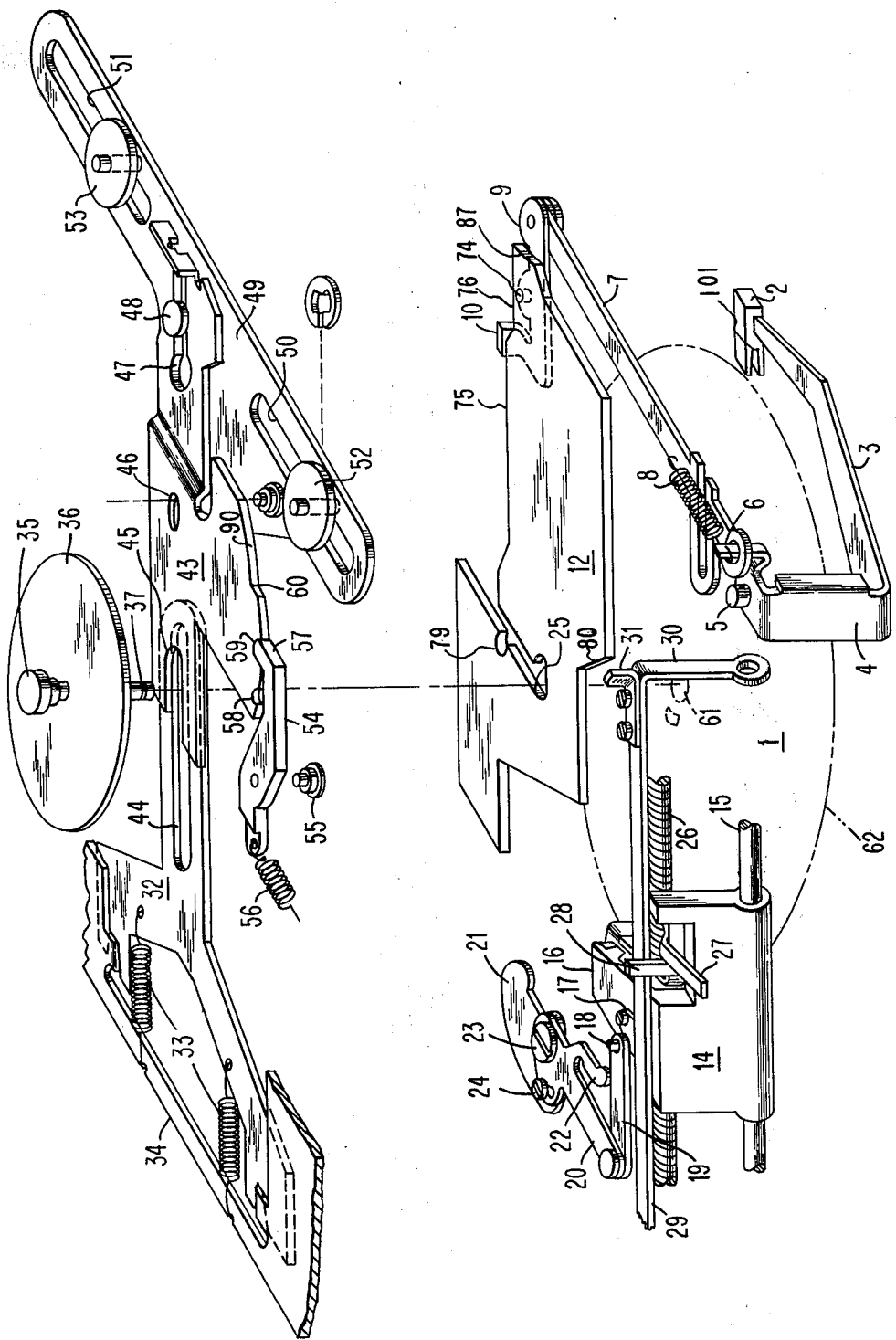
FIG. 1 is an exploded perspective view illustrating a major portion of the control apparatus of this invention as related to a single control button and a recording disc.

Referring first to FIG. 1, there is shown a control button 35 which is to be manipulated by an operator for selecting various functions and operations such as stop, play, reverse, record, special instruction, and eject. Control button 35 can be equivalent to control button 29 in FIG. 1 of U.S. Pat. No. 3,822,372. The function and operation positions can also be considered equivalent with the exception of the "off" position. In the subject application this is the "eject" position. Further, the path of travel of the control button 29 in the referenced patent is arcuate from the record to the reverse positions. In the instant application this path is linear.

Disc 1 in FIG. 1 for purposes herein can be considered equivalent to the discs illustrated in either of U.S. Pat. Nos. 3,729,201 and 3,797,035. Disc 1 is rotatable about central opening 61 for playing, reviewing, recording, and special instruction recording.

Control button 35 is connected to shaft 37 which extends through slot 45 in control arm 43, slot 44 in centering arm 32, and opening 25 in eject cam 12.

Control button 35 is detented in the stop, play or listen, and record positions. Also, control button 35 is spring-biased away from the reverse position toward the play position and away from the special instruction position toward the record position. Further, control button 35 is spring-biased at all times toward the stop position. When moved toward the eject position, disc 1 is caused to be ejected. Upon reaching the eject position, button 35 will be latched or locked. Unlatching occurs upon insertion of a new disc. This will be brought out more fully later in the specification.

Figure 2:
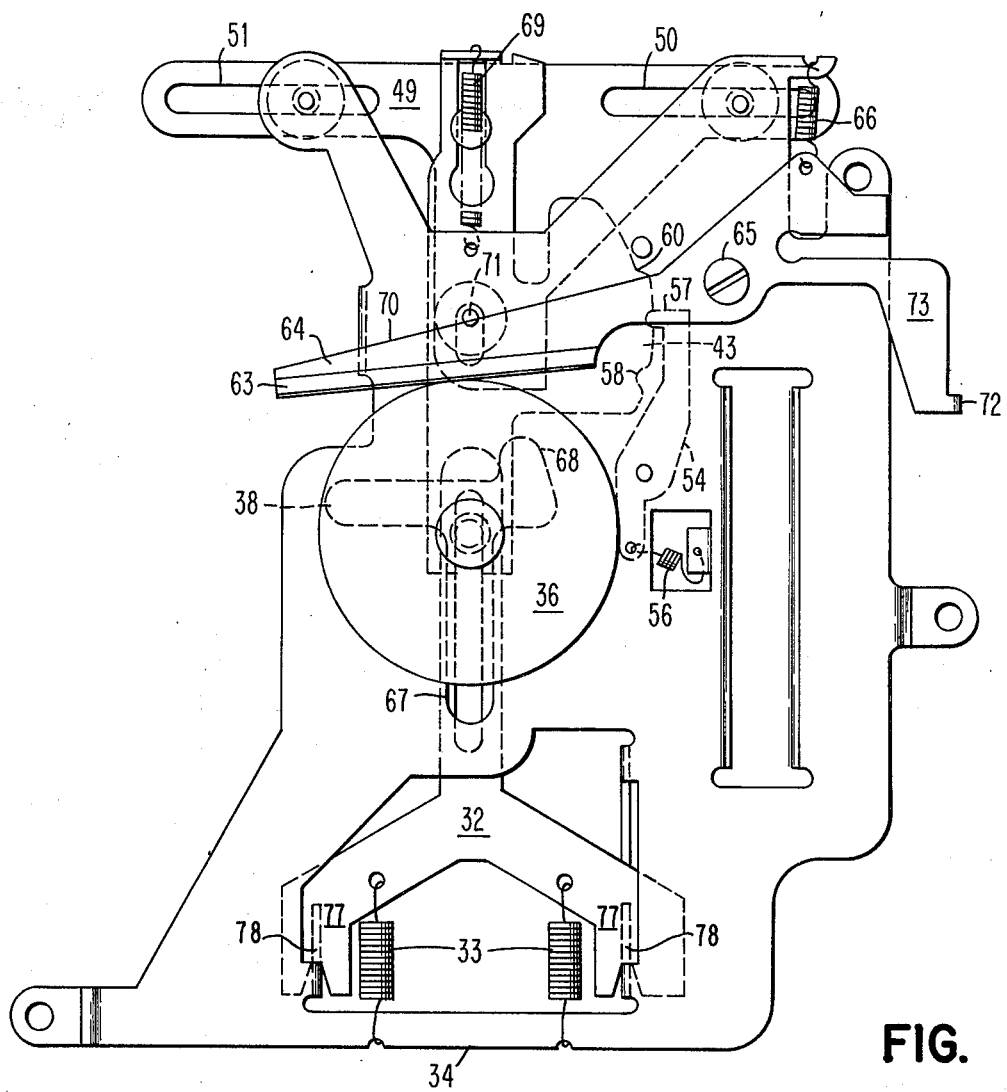
FIG. 2 is a plan view of the upper portion of FIG. 1 in association with a frame and additional structure.

Refer next to FIG. 2 in conjunction with the upper portion of FIG. 1. Control arm 43 and detent pawl 54 are secured by shoulder rivets 71 and 55, respectively, to control frame 34. Pawl 54 is rotatable about rivet 55. Shoulder rivet 71 fits in slot 46. Arm 43 is slideable relative to, and rotatable about, rivet 71. The legs 77 of centering arm 32 are fitted in openings in slotted tabs 78 on control frame 34 and maintained by springs 33.

Slider 49 carries a shoulder rivet 48. Control arm 43 is slideable along rivet 48 about slot 47. Slider 49 is slidably connected to pins 52 and 53 along slots 50 and 51, respectively. Pins 52 and 53 are secured to control frame 34. Control arm 43 is held in the position shown by extension spring 69. Detent pawl 54 is held with end 57 in one of detents 58–60 by tension spring 56.

The function and operation path of travel of control button 35 is defined by opening 38 in control frame 34. As shown, the control button 35 is in the stop position and end 57 of detent pawl 54 is engaging "stop" detent 59. For travel to all positions except eject, control button 35 is freely moveable in opening 25 in eject cam 12. This will be brought out more fully later in the specification.

When control button 35 is moved to the play position, control arm 43 is rotated until the "play" detent 60 is reached. During this movement, slider 49 is translated and a switch (not shown) is tripped. Also, centering arm 32 is rotated about upper leg 77. This causes extension of the lower of springs 33 and results in a restoring force being applied to the control button 35. The force applied by spring 56 for holding end 57 of detent pawl 54 in detent 60 is greater than the force of the lower of springs 33. Therefore, control button 35 is maintained in the play position.

When the control button 35 is moved from the play position to the reverse (review) position, slider 49 will be further translated to trip another switch (not shown). Also, end 57 of detent pawl 54 will ride along surface 90 of control arm 43. Surface 90 forms the open end of detent 60. Since this position is not detented, control button 35 will restore to the play position "60" when released by the operator.

When control button 35 is moved from the stop position to the record position, end 57 of detent pawl 54 will engage "record" detent 58 in control arm 43. In this case, slider 49 will be translated in a direction opposite that described above for play, and yet another switch (not shown) will be tripped. Further, centering arm 32 will be rotated about lower leg 77 against the upper of springs 33. The force applied by spring 56 is greater than the force of the upper of springs 33. Therefore, control button 35 is maintained in the record position.

If control button 35 is then moved to the special instruction position, control arm 43 will be moved to the right along slot 46 on shoulder rivet 71. This will cause still another switch (not shown) to be tripped for causing a tone to be superimposed upon the recording disc 1. During this motion, slider 49 will remain in the record position. When the button 35 is released, it will restore to the record position under the influence of extension spring 69. Slot 68 in opening 38 in control frame 34 defines the special instruction position.

If control button 35 is moved from the stop position to the eject position, shaft 37 will engage slot 79 in opening 25 in eject cam 12, and displace eject cam 12 to the left. During the translation of eject cam 12 to the left, bail 29 will be caused to rotate. This is due to tab 31 being contacted by surface 80 of eject cam 12. Rotation of bail 29 will cause rotation of tab 28. Tab 28 has connected thereto a magnetic transducer or read/write/erase head (not shown). Tab 28 is hingedly connected to pawl 27. Upon rotation of tab 28, pawl 27 will be disengaged from leadscrew 26. Tab 28 and pawl 27 are carried by head carrier 14 which is slidably mounted on rod 15. End 30 of bail 29 is rotatably mounted on rod 15 about its lower end. As control button 35 is moved toward the eject position from the stop position, shaft 37 will leave slot 45. When shaft 37 leaves slot 45, it will no longer influence control arm 43. Therefore, rotation of control arm 43 will no longer be restrained. This is because the centering arm 32 is no longer connected thereto through shaft 37. Shaft 37 is now located in the left end of slot 44. Therefore, pawl 54 and detent 59 prevent movement until a new disc is inserted, and the control button 35 is moved back to the stop position.

Refer specifically to FIG. 2. When the control button 35 is moved to the stop position, crank 73 is rotated about pivot screw 65 against spring 66. This is because washer 36, which is connected to shaft 37, contacts flange 63 on end 64 of crank 73. This will result in a switch (not shown) being tripped through a linkage connected to tab 72. The tripping of this switch will result in power being shut off to the machine. Crank 73 will also be rotated when control button 35 is moved to other positions along opening 38, and the other switches described above will be tripped. Due to other control means (not shown), this particular switch will only influence the machine when control button 35 is in the stop position.

Figure 3:
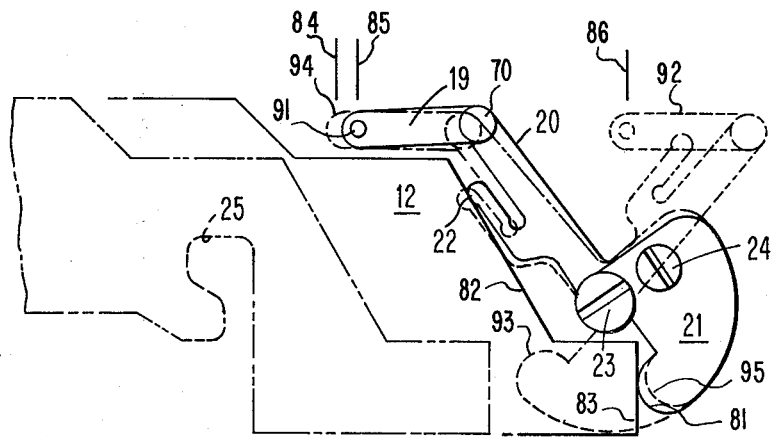
FIG. 3 is an operational plan view of the lower left portion of the apparatus shown in FIG. 1.

Refer next to FIG. 3 in conjunction with the lower left portion of FIG. 1. When a used (recorded-on) disc is to be ejected and a new (unrecorded-on) disc inserted, the read/write/erase head (not shown) connected to tab 28 is to be located in a "home" position. The home position is defined by the head being located within a specified number of tracks of the phased or begin record position on the disc. For purposes herein, if the head is within two tracks of the phased position, it is in the home position. "Homing" is to take place regardless of where the head is located within its range of travel along leadscrew 26. This is so, since when a new disc is to be phased, it must be rotatable at least one revolution before causing the head to reach an extreme point of travel. The particular object here is to restore the soundhead to the home position and lock it, by means to be described later in the specification. The head is to be locked in order that it may not be moved until a new disc is inserted and positioned in the play station. The play station is defined to be the location of a disc on a spindle, as shown in the above-referenced U.S. Pat. Nos. 3,797,035 and 3,729,201, positioned for recording, etc.

The apparatus in question includes restore arm 20 and connecting link 19 which are held together by, and pivotable about, rivet 70. Connecting link 19 is connected to extension 16 of head carrier 14 by means of plate 17. Plate 17 has restore post 18 which communicates with opening 91 in connecting link 19. Restore actuator 21 is connected to restore arm 20 by means of screw 23. Screw 23 is secured to control frame 34. Restore actuator 21 is adjustable relative to restore arm 20 through locking screw 24. When restore actuator 21 and restore arm 20 are locked together by locking screw 24, both are rotatable in unison about screw 23.

Refer specifically to FIG. 3 and the dotted line positions 92 and 93 of connecting link 19 and restore actuator 21, respectively. For these positions the soundhead is at the outer periphery of disc 1 and head carrier 14 is located on the left end of leadscrew 26 (FIG. 1). This is illustrated by plane 86. Refer next to the solid line positions of connecting link 19 and restore actuator 21. The soundhead is in the home position and eject cam 12 is in the locked eject position as will hereinafter be described. This is illustrated by plane 85. Tang 22, which forms part of restore arm 20, is in contact with surface 82 of eject cam 12. End 81 of restore actuator 21 is in contact with surface 83 of eject cam 12. At this time, the soundhead is within a desired number of tracks of the phase or begin record position on disc 1.

The dotted line positions 94 and 95 of connecting link 19 and restore actuator 21, respectively, represent the positions of the components when the soundhead is in the phased position. This is illustrated by plane 84.

Figure 4:
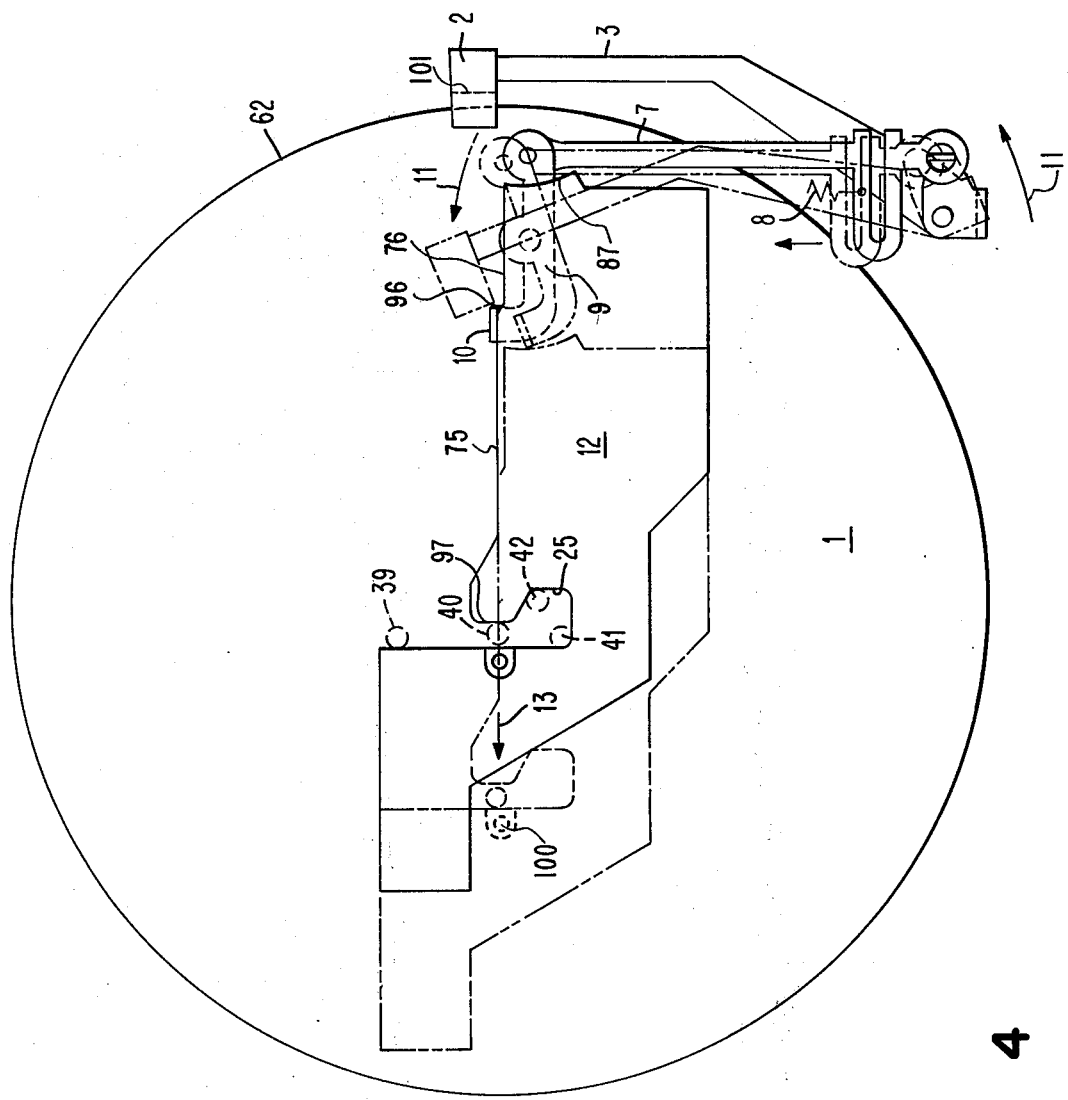
FIG. 4 is an operational plan view of the lower right portion of the apparatus shown in FIG. 1.

As can be seen from FIG. 1, the layout is such that the control for disc ejecting and loading is through control button 35 on the top of the apparatus, while disc 1 is located on the bottom of the apparatus. Refer next to FIG. 4 in conjunction with the lower right portion of FIG. 1. The portion of the disc ejecting and loading apparatus illustrated in FIG. 4 must be capable of forceably ejecting disc 1, and at the same time, cause a minimum load on control button 35. Further, after a new disc has been inserted and positioned in the play station, all ejecting and loading structure must be clear of the disc to avoid drag or interference therewith during rotation thereof. Also, the loading and ejecting structure must be such that it is restored by the disc. Since the disc contemplated for use herein is thin and flexible, the restoration loads must be light enough that they will not cause buckling of the disc.

Referring to the solid line position of eject cam 12 in FIG. 4, control button 35 can be at any one of positions 39–42 in opening 25. For translating control button 35 to position 100 and thereby translating eject cam 12 to the left, control button 35 must be in position 40. Position 40 corresponds to the stop position. With control button 35 in the stop position, tab 10 on eject crank 9 is in contact with surface 75 of eject cam 12. When in this position, there is a clearance between slot bottom 101 of eject shoe 2 and the periphery 62 of disc 1.

Tension spring 8 is connected to post 6 on its lower end and to frame 34 on its upper end. As the eject cam 12 is moved in the direction of arrow 13 and toward the position shown in dotted lines, tension spring 8 urges rotation of eject crank 9. Tab 10 on eject crank 9 will ride down ramp 96 and into contact with surface 76 of eject cam 12. This urges link 7 in an upward direction for rotating eject crank 9 in a counterclockwise direction. Slot bottom 101 of eject shoe 2 is then brought into contact with periphery 62 of disc 1. During further travel of eject cam 12 to the left, latch surface 87 of eject cam 12 will clear the left edge of tab 10. Eject arm 3 and eject shoe 2 will then further rotate about shoulder screw 74, bringing tab 10 into contact with surface 87. Shoulder screw 74 is secured to frame 34 and forms a pivot point about which eject crank 9 is rotatable. As tab 10 is brought into contact with, and rides along latch surface 87, link 7 is translated in an upward direction. During this translation, support 4 for eject arm 3 is rotated about pivot 5 in the direction of arrow 11. This causes shoe 2 to force or eject disc 1 to the left and out of the machine. Also, with tab 10 in contact with latch surface 87, eject cam 12 is latched or locked against movement to the right.

When a new disc is then inserted from the left, it will first contact eject shoe 2 and cause eject arm 3 to rotate. This causes the tab 10 of eject crank 9 to rotate out of contact with surface 87. Eject cam 12 is now freed for movement to the right under the influence of control button 35. Upon movement of control button 35 to the right, shaft 37 will contact surface 97 and cause eject cam 12 to be moved to the right. As the eject cam 12 is moved to the position shown in solid lines, the tab 10 on eject crank 9 will ride along surface 76, up ramp 96, and along surface 75. This riding up ramp 96 causes slot bottom 101 of eject shoe 2 to be brought out of contact with the disc.

In summary, a portable recorder control apparatus is provided which is primarily made up of 1) structure, operable by the single control button, for conditioning the recorder for performing dictation functions, 2) structure, operable by the control button, for ejecting a disc, and 3) structure, operable upon insertion of a disc, for loading the disc into the recorder. Ejecting a disc requires cooperation of a number of elements in sequence. This sequence is initiated through manipulation of the control button. Insertion of a new disc into the recorder necessitates that a portion of this sequence be performed in reverse. This is initiated with the disc itself upon insertion thereof.

The operations which take place during ejection of a disc are: 1) disengaging a pawl from a leadscrew; 2) restoring a soundhead to a home position; 3) retracting a spindle from the disc; 4) restoring the head to the home position, if it were in a phased position prior to starting the disc eject operation; 5) disengaging a drive roller from the disc; 6) ejecting the disc; and 7) latching an eject cam in an eject position.

The operations which take place when inserting a new disc are: 1) unlatching the eject cam; 2) engaging the spindle with the disc; 3) engaging the drive roller with the disc; and 4) retracting of an eject arm from the disc.

While the invention has been particularly shown and described with reference to particular embodiments, it will be understood by those skilled in the art that various changes in form and detail may be made without departing from the spirit and scope of the invention.

What is claimed is:

1. A portable recorder control apparatus for both facilitating the performance of multiple dictation functions and performing record media handling operations through manipulation of a single button, said apparatus comprising:
    a. first means operable by said button for causing a recorder to be conditioned for performing said dictation functions upon positioning said button in dictation function locations along a function and operation path;
    b. means for causing a record medium to be unloaded from said recorder;
    c. means for causing a transducer to be repositioned during unloading of said record medium; and
    d. second means operable by said button and including 1) means for causing said record medium to be unloaded by said unloading means, and 2) means for causing said transducer to be repositioned by said repositioning means, as said button is moved along said path to an operation location.

2. An apparatus according to claim 1 including means for locking said second means against movement back along the same path from said operation location when said button is positioned in said operation location.

3. An apparatus according to claim 1 including means for locking said second means against further movement in the same direction along said path when said button is positioned in said operation location.

4. An apparatus according to claim 2 wherein said locking means is included in said unloading means.

5. An apparatus according to claim 3 wherein said locking means is included in said repositioning means.

6. An apparatus according to claim 4 wherein said including means includes means for causing unlocking of said locking means during loading of a record medium.

7. An apparatus according to claim 6 wherein said unloading means includes means for causing said unloading means to be displaced from said loaded record medium when said button is moved from said operation location to a function location along said path.

8. An apparatus according to claim 1 including a pawl carried by a carrier for said transducer and engageable with a leadscrew for controlling translation of said transducer relative to said record medium.

9. An apparatus according to claim 8 wherein said second means includes means for causing disengagement of said pawl from said leadscrew when said button is moved to said operation location.

10. An apparatus according to claim 9 wherein said transducer carrier is connected to said repositioning means.

* * * * *